United States Patent
Kasahara (10) Patent No.: US 9,506,745 B2
(45) Date of Patent: Nov. 29, 2016

(54) ERROR MEASUREMENT METHOD AND MACHINE TOOL

(75) Inventor: Tadashi Kasahara, Aiko-gun (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 28 days.

(21) Appl. No.: 14/361,656

(22) PCT Filed: Nov. 30, 2011

(86) PCT No.: PCT/JP2011/077682
§ 371 (c)(1),
(2), (4) Date: May 29, 2014

(87) PCT Pub. No.: WO2013/080336
PCT Pub. Date: Jun. 6, 2013

(65) Prior Publication Data
US 2014/0355002 A1    Dec. 4, 2014

(51) Int. Cl.
| | |
|---|---|
| *G01B 11/00* | (2006.01) |
| *G01B 11/02* | (2006.01) |
| *G01B 9/02* | (2006.01) |
| *B23Q 17/24* | (2006.01) |
| *G05B 19/401* | (2006.01) |

(52) U.S. Cl.
CPC ........... *G01B 11/02* (2013.01); *B23Q 17/2428* (2013.01); *G01B 9/02016* (2013.01); *G01B 9/02049* (2013.01); *G01B 11/026* (2013.01); *B23Q 17/2495* (2013.01); *G05B 19/401* (2013.01)

(58) Field of Classification Search
CPC .... G01B 11/002; G01B 11/005; G01B 11/03
USPC ........................................ 356/498, 500, 508
See application file for complete search history.

(56) References Cited

U.S. PATENT DOCUMENTS

| | | | | |
|---|---|---|---|---|
| 5,508,806 A | * | 4/1996 | Dowdy | G01B 11/26 356/508 |
| 2013/0215435 A1 | * | 8/2013 | Schmidt | G01B 11/005 356/614 |

FOREIGN PATENT DOCUMENTS

| | | |
|---|---|---|
| CA | 2 741 775 | 11/2011 |
| JP | 7-246547 | 9/1995 |

(Continued)

OTHER PUBLICATIONS

International Search Report mailed Mar. 6, 2012, directed to International Application No. PCT/JP2011/077682; 1 page.

(Continued)

*Primary Examiner* — Jonathan Hansen
(74) *Attorney, Agent, or Firm* — Morrison & Foerster LLP (57) ABSTRACT

A method for measuring errors in the linear feed shafts of a multi-spindle machine tool having two or more rotating feed shafts in addition to three linear feed shafts, wherein: at least first through third reflecting mirrors are attached to a table of the machine tool; a laser length-measuring machine is attached to the tip of a principal shaft of the machine tool; the linear feed shafts are driven, and the laser length-measuring machine is moved to prescribed measuring points; the two or more rotating feed shafts are driven at each of the measuring points; the coordinates at each measuring point are calculated by measuring the distances between the first through third reflecting mirrors and the laser length-measuring machine; and errors in the linear feed shafts of the machine tool are obtained by comparing the machine coordinates of the machine tool.

8 Claims, 6 Drawing Sheets

(56) References Cited

FOREIGN PATENT DOCUMENTS

| JP | 9-183042 | 7/1997 |
| JP | 2008-269316 | 11/2008 |

OTHER PUBLICATIONS

Extended European Search Report dated Sep. 22, 2015, directed to EP Application No. 11876460.4; 5 pages.

* cited by examiner

ERROR MEASUREMENT METHOD AND MACHINE TOOL

CROSS REFERENCE TO RELATED APPLICATIONS

This application is a U.S. National Phase patent application of PCT/JP2011/077682, filed on Nov. 30, 2011, the entirety of which is hereby incorporated by reference in the present disclosure.

FIELD OF THE INVENTION

The invention relates to a method of measuring an error in linear feed axes of a machine tool having at least two rotational feed axes of A-axis and C-axis in addition to three orthogonal axes of X-, Y- and Z-axes, and a machine tool.

BACKGROUND OF THE INVENTION

A machine tool processes a workpiece by relatively moving, in three orthogonal axes directions of X-, Y- and Z-axes, a workpiece attached to a table and a tool attached to the end of a spindle. In the field of machine tools, in order to increase accuracy, error measurement methods using a laser beam have been developed.

For example, Patent Document 1 describes a laser tracking-type measuring device for tracking the travel of a reflector attached to a tool mounting shaft in order to detect the coordinate of a tool based on the displacement of the tracked reflector.

PATENT PUBLICATIONS

Patent Document 1: Japanese Unexamined Patent Publication No. H07-246547

SUMMARY OF THE INVENTION

The invention described in patent document 1 must have four laser tracking devices, each of which includes a rotational supporting mechanism in order to track a reflector, and thus is very large and expensive.

The present invention is directed to solve the problems in the prior art, and the objective of the invention is to provide a simple and low cost method and machine tool for measuring errors in the linear feed axes.

According to the invention, there is provided a method of measuring errors of linear feed axes of a multi feed axis machine tool having at least two rotational feed axes as well as three orthogonal linear feed axes, i.e., X-, Y- and Z-axes, the method comprising the steps of attaching at least first to third reflector mirrors to a table of the machine tool, attaching a laser length measuring device to an end of a spindle of the machine tool, moving the laser length measuring device to predetermined measuring points by driving the three linear feed axes, orienting the laser length measuring device to the reflector mirrors by driving the at least two rotational feed axes to measure the lengths between the first to third reflector mirrors and the laser length measuring device whereby the coordinates of the respective measuring points are calculated, and comparing the machine coordinates of the machine tool at the measuring points with the calculated coordinates of the measuring points whereby errors of the linear feed axes of the machine tool are obtained.

Further, according to another feature of the invention, there is provide a machine tool with a table to which a workpiece is attached, a spindle, supported for rotation, for holding a tool, linear feed axes for relatively moving the table and the spindle in three orthogonal X-, Y-, and Z-axes directions and at least two rotational feed axes, the machine tool comprising a laser length measuring device attached to an end of a spindle, and first to third reflector mirrors attached to a table of the machine tool, wherein the laser length measuring device is moved to predetermined measuring points by driving the three linear feed axes, and oriented to the reflector mirrors by driving the at least two rotational feed axes to measure the lengths between the first to third reflector mirrors and the laser length measuring device whereby the coordinates of the respective measuring points are calculated, the calculated coordinates of the measuring points being compared with the machine coordinates of the machine tool at the measuring points whereby errors of the linear feed axes of the machine tool are measured is provided.

DETAILED DESCRIPTION OF THE INVENTION

Figure 1:
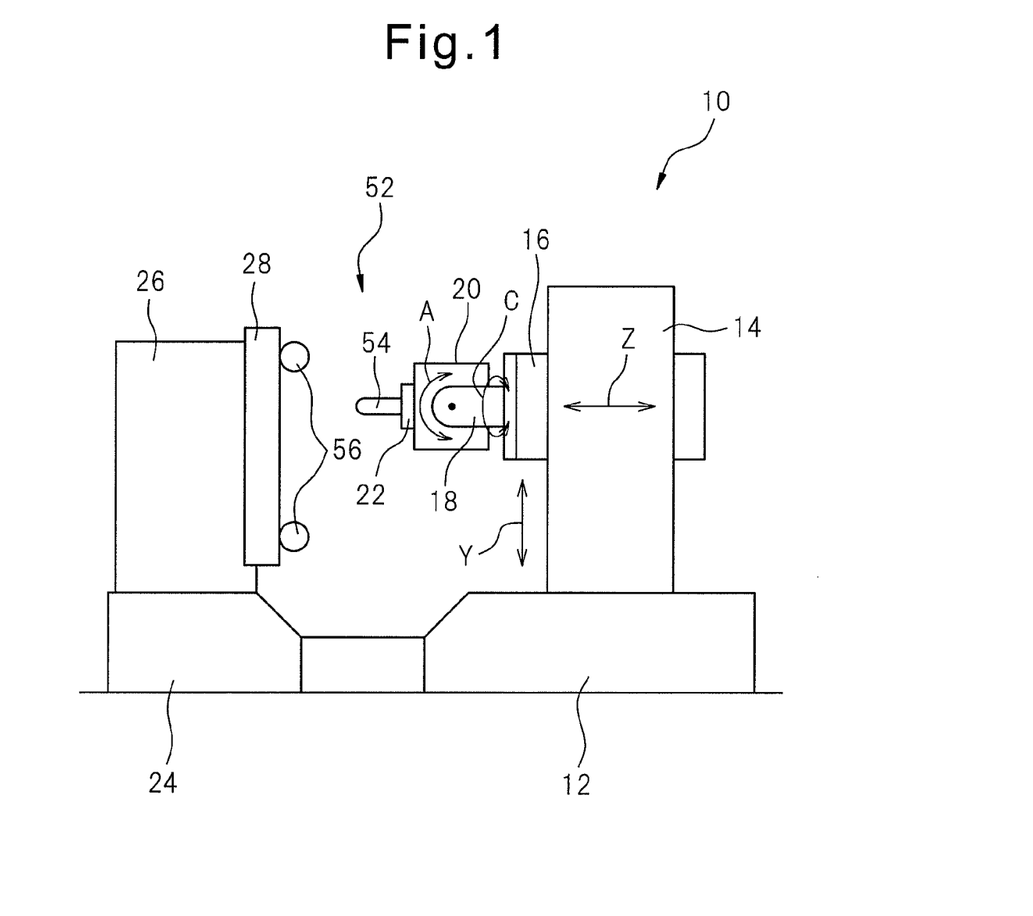
FIG. 1 is a side view of a machine tool according to a preferred embodiment of the invention.
Figure 2:
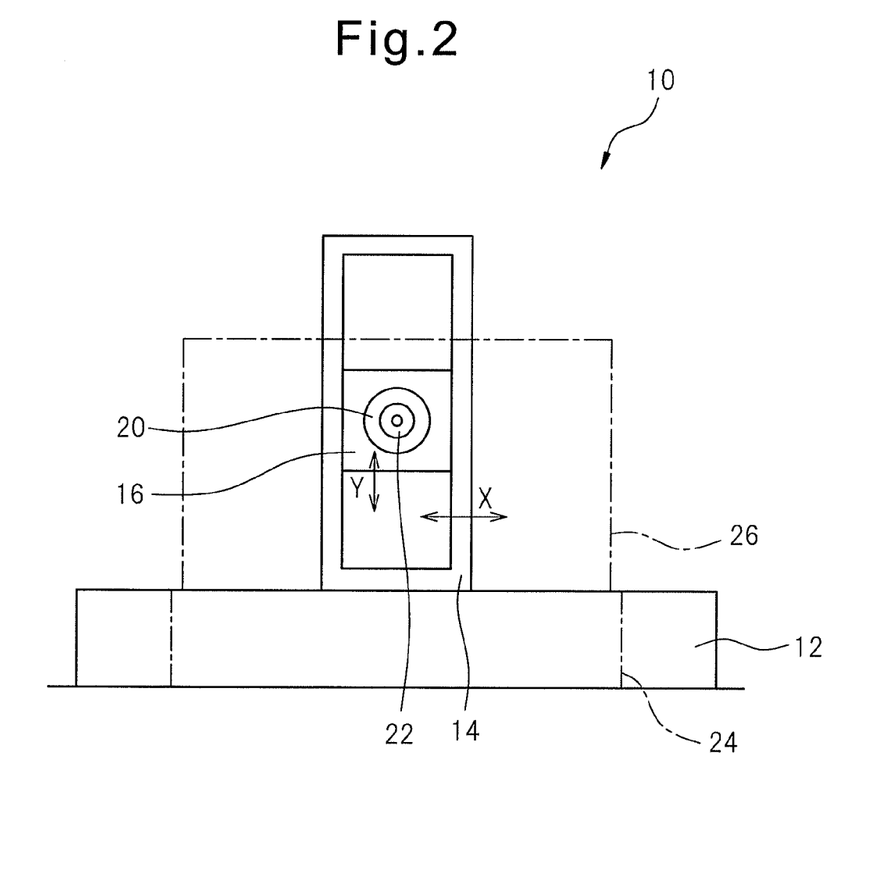
FIG. 2 is a front view of a column of the machine tool of FIG. 1.

With reference to the drawings, a preferred embodiment of the invention will be described below. A numerically controlled machine tool according to the invention is provided with a numerical control device for operating the machine toll in accordance with a processing program. With reference to FIGS. 1 and 2, a horizontal type machine tool 10 having five feed axes wherein A- and C-axes are provided on a spindle is shown. The machine tool 10 comprises a rear bed 12 fixed on a floor, a column 14 mounted on a top face of the rear bed 12 for linear motion in a horizontal direction, i.e., X-axis direction, a head stock 15 mounted to the column 14 for linear motion in both vertical and horizontal directions, i.e., Y- and Z-axis directions, a bracket 18 mounted to a front face of the head stock 16 for rotation around C-axis parallel to the Z-axis, a spindle head 20, mounted to the bracket 18 for rotation about A-axis parallel to the X-axis, for rotatably supporting a spindle 22, a front bed 24 placed side by side in the Z-axis direction relative to the rear bed 12 and a table 26 mounted to the front bed 24 so as to face the spindle 22. The Z-axis extends horizontally perpendicular to both the X- and Y-axes. Further, the machine tool 10 comprises a measurement apparatus 52.

Figure 3:
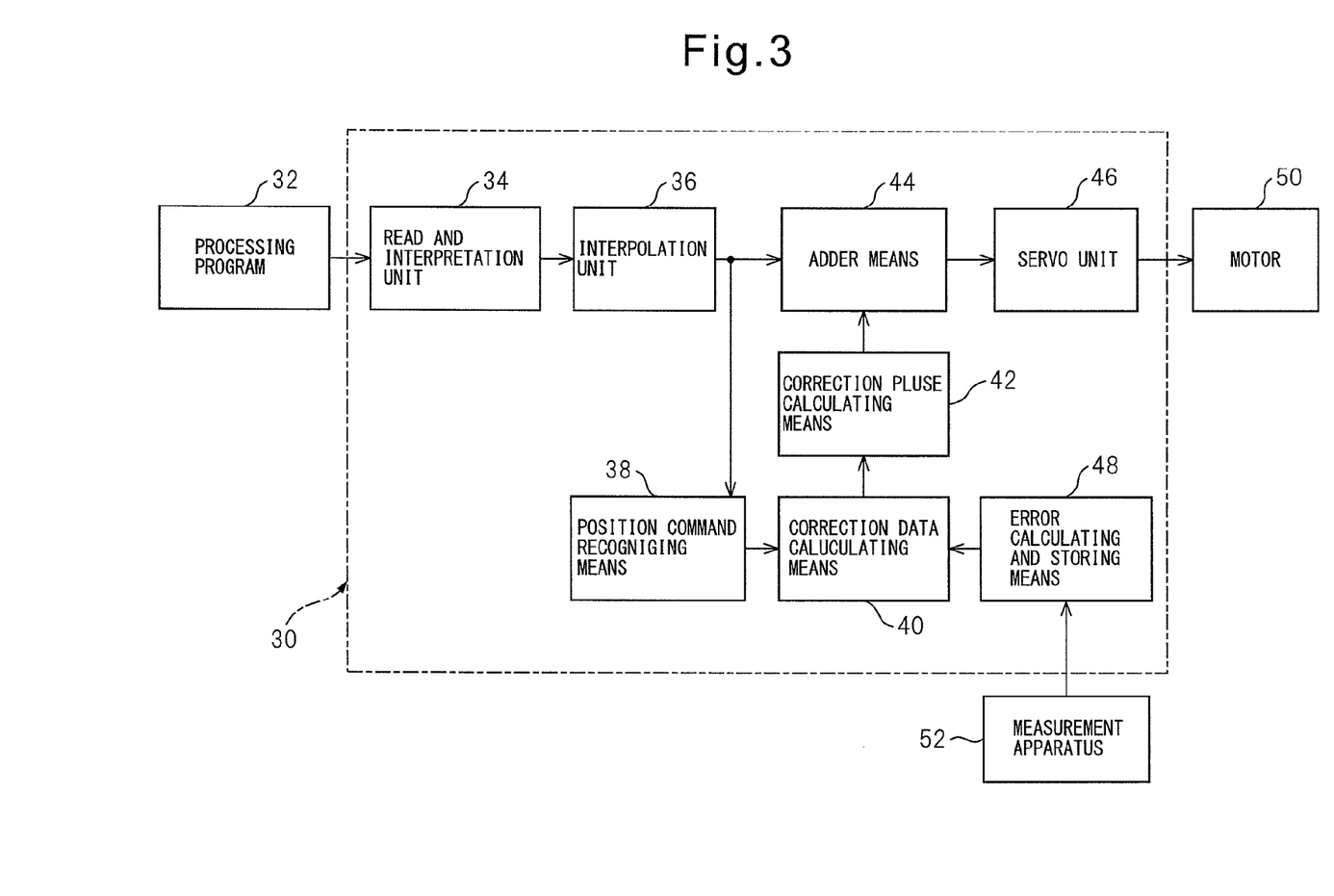
FIG. 3 is a block diagram of an embodiment of a numerical control device for controlling the feed axes of the machine tool of FIG. 1.

With reference to FIG. 3, a numerical control device 30, for controlling the position of the feed axes of the machine tool 10, comprises a read and interpretation unit 34 for reading and interpreting a processing program 32, and for calculating command speeds and positions for the respective feed axes, an interpolation unit 36 for calculating command pulses based on the command positions and speeds in order to linearly or circularly interpolating the feed rates of the respective feed axes, position command recognizing means 38 for receiving the command pulses and recognizing the position commands to the respective feed axes, error calculating and storing means 48 for calculating errors based on measurement data which is measured by a measurement apparatus 52 and the machine coordinates which are obtained by reading the digital scales of the respective X-, Y- and Z-axes of the machine tool 10 and for storing the obtained errors, correction data calculating means 40 for calculating correction data for correcting the position commands based on the position commands and the error data stored in the error calculating and storing means 48, correction pulse calculating means 42 for obtaining correction pulses for correcting the position commands based on the correction data, a servo unit 46 for controlling the motors 50 of the respective feed axes and adder means 44 for outputting pulses obtained by adding the command pulses and the correction pulses.

The measurement apparatus 52 will be described in detail. In this embodiment, the measurement apparatus 52 comprises a laser length measuring device 54 fitted into a tool fitting hole (not shown) defined in the spindle 22 and a plurality of reflector mirrors 56 attached to the table 26. In this embodiment, a laser interferometer is used as the laser length measuring device 54. Laser interferometers include, for example, a laser source for emitting a frequency stabilized helium-neon laser, a beam splitter for dividing the laser beam from the laser source into two beams, and a counter composed of, for example, a photodiode array for counting the number of interference of fringes generated by the interference between one of the two split beams and the other of the split beams reflected from the reflector mirrors 56 whereby changes in the optical pass length is measured based on the changes in the number of the interference of fringes.

The reflector mirrors 56 comprises a retroreflector which reflects the laser beam in the original direction regardless of changes in the incident angle of the laser beam into the reflector mirrors 56. In this embodiment, the reflector mirrors 56 comprises first to fourth reflector mirrors 56a-56d secured to the four corners of a pallet 28 detachably secured to the table 26.

The measurement principal of the measurement apparatus 52 according to this embodiment will be described below.

As described above, in this embodiment, the laser length measuring device 54 is a laser interferometer which measures, based on the changes in the number of the interference of fringes, the difference in the length (optical pass length) between one of the first to fourth reflector mirrors 56a-56d and a measuring point and between the same reflector mirror and a current measuring point base on the following equation.

$$\Delta L(i,j) = (L(Pi,Hj) - L(P0,Hj))$$

Where:
ΔL: optical pass length difference
Pi: ith measuring point
P0: first measuring point providing a reference measuring point
Hj: jth reflector mirror
L(P0, Hj): the length (optical pass length) between the first measuring point and the jth reflector mirror
L(Pi, Hj): the length (optical pass length) between the ith measuring point and the jth reflector mirror The length between the ith measuring point and the jth reflector mirror is generally expressed by the following equation.

$$L(Pi,Hj) = ((Xi-Xhj)^2 + (Yi-Yhj)^2 + (Zi-Zhj)^2)^{1/2} \quad (1)$$

Where:
Xi: X-coordinate of the ith measuring point (Pi)
Xhj: X-coordinate of the jth reflector mirror (Hj)
Yi: Y-coordinate of the ith measuring point (Pi)
Yhj: Y-coordinate of the jth reflector mirror (Hj)
Zi: Z-coordinate of the ith measuring point (Pi)
Zhj: Z-coordinate of the jth reflector mirror (Hj)

When m is the number of the measurement points, i.e., i=1 to m, if the reflector mirrors 56 comprises four reflector mirrors, then the number of the unknown is 12+3×m (the coordinates of the four reflector mirrors provide 12 unknowns, and the coordinates of the measurement points provide 3×m unknowns). Therefore, if m=12, equation (1) can be solved by simultaneous equations. If m is larger than 12, then the number of the simultaneous equations is larger than the number of the unknowns, whereby the solution becomes redundant (different combinations of solution are provided depending on the combination of the equations). The solutions are averaged by for example least-squares method. The measured errors are stored in the error calculating and storing means 48 in the form of an error map in a processing space defined by the three orthogonal X-, Y- and Z-axes.

With reference to FIGS. 4-8, an error measurement method according to the present embodiment will be described below.

Figure 4:
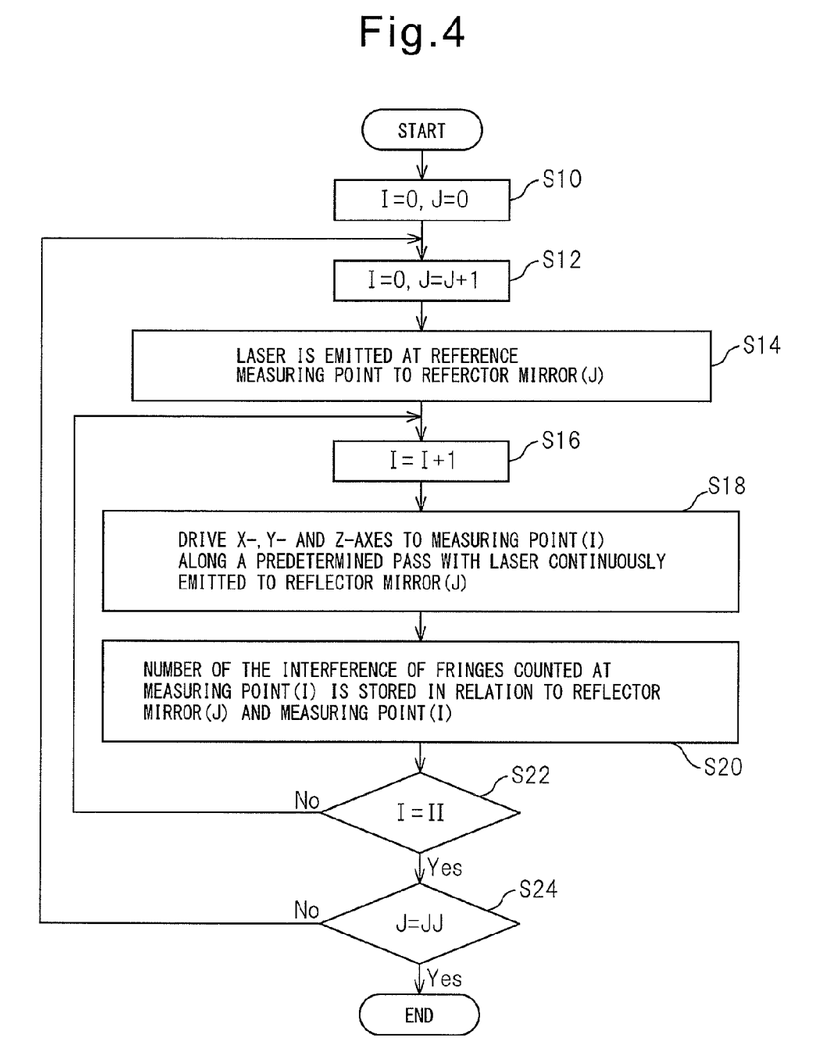
FIG. 4 is a flowchart showing an example of an error measurement method.

When the error measurement process is started, the parameters I and J are reset to 0 (step S10), followed by inputting 1 into J (step S12). The parameter I denotes the measurement point. The parameter J relates to the first to fourth reflector mirrors 56a-56d, i.e., J=1, J=2, J=3 and J=4 denote the first reflector mirror 56a, the second reflector mirror 56b, the third reflector mirror 56c and the fourth reflector mirror 56d, respectively.

Figure 5:
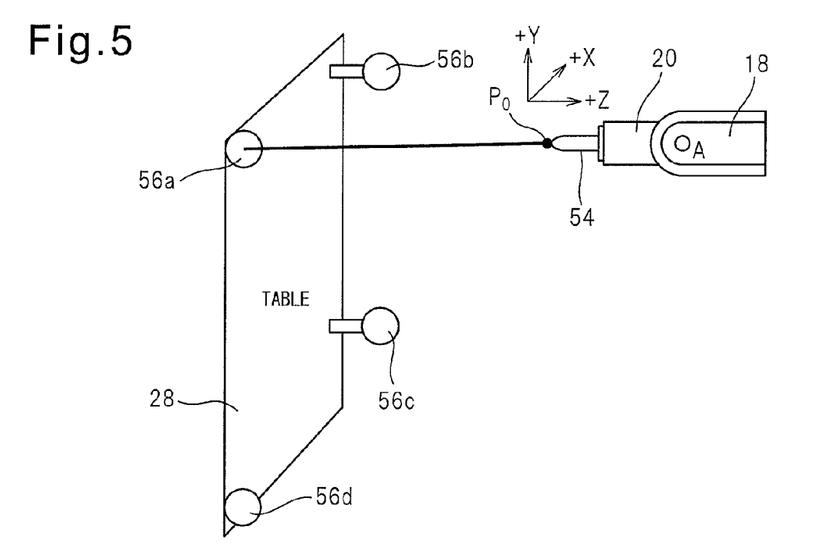
FIG. 5 is a schematic illustration of the error measurement apparatus, explaining the error measurement method.

As shown in FIG. 4, by driving the three orthogonal linear feed axes, i.e., X-, Y- and Z-axes and rotational feed axes, i.e., A- and C-axes of the machine tool 10, the laser length measuring device 54, in particular the working section of its counter for counting the number of the interference of fringes is moved to the reference measuring point P0 so that a laser beam is emitted to the reflector mirror (J=1), i.e., the first reflector mirror 56a whereby the number of the interference of fringes is measured at the reference measuring point P0 (step S14). Then, 1 is added to the parameter I (step S16), followed by moving the laser length measuring device 54 to the measuring point (P1) along the predetermined pass 58, as shown in FIG. 5, by driving the X-, Y- and Z-feed axes (step S18), with the laser beam continuously oriented to the first reflector mirror 56a. At the measuring point (P1), the counted number of the interference of fringes is stored in relation to the reflector mirror (J) and the measuring point (P1) (step S20).

Figure 6:
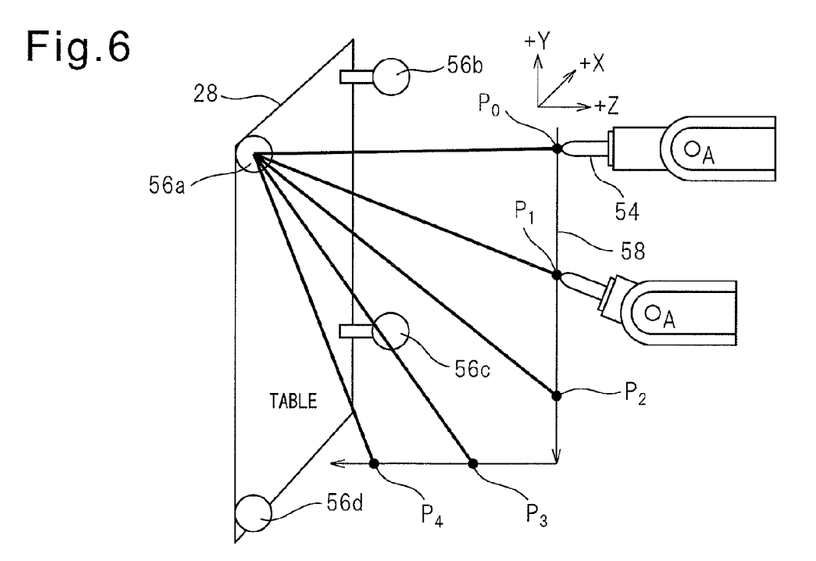
FIG. 6 is a schematic illustration of the error measurement apparatus, explaining the error measurement method.
Figure 8:
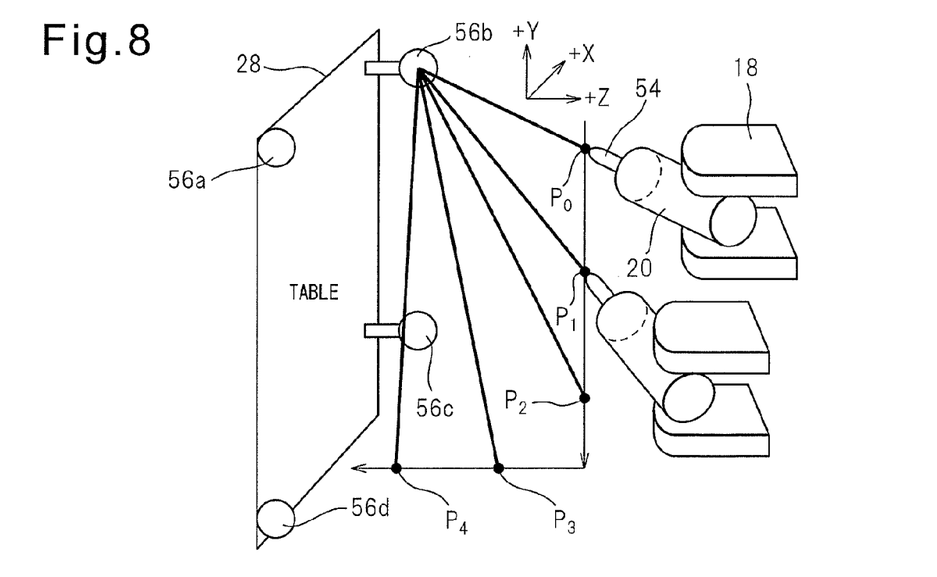
FIG. 8 is a schematic illustration of the error measurement apparatus, explaining the error measurement method.

Then, I is compared with a predetermined integer II in order to determine whether or not the present measuring point (Pi) is the last one of the measuring points (step S22). II=4, when the program has, for example, five measuring points, as shown in FIGS. 6 and 8, for each of the first to fourth reflector mirrors 56a-56d. When the measurement is not completed for all of the measuring points (No at step S22), the flowchart goes back to step S16 whereby 1 is added to I, then steps S18 and S20 are carried out again.

Figure 7:
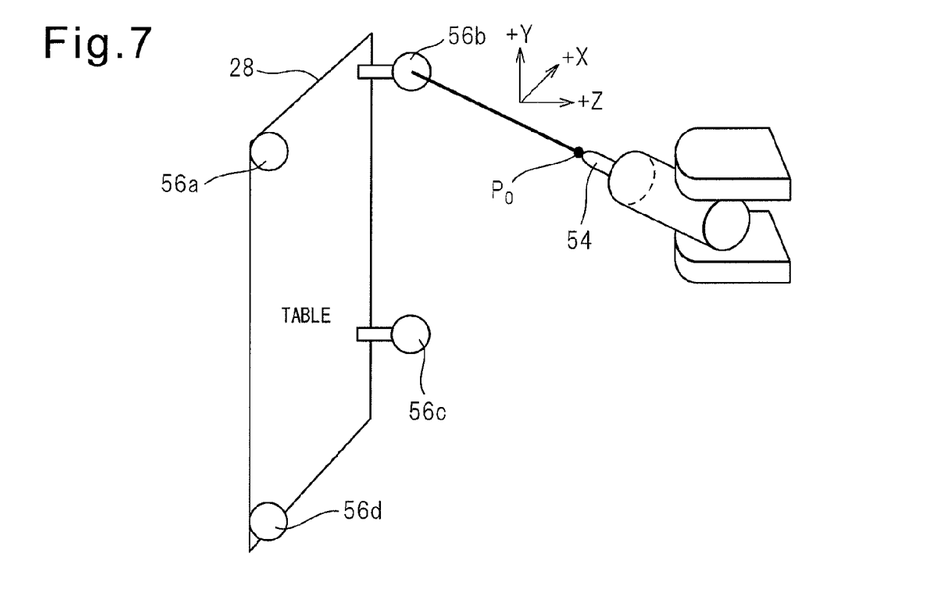
FIG. 7 is a schematic illustration of the error measurement apparatus, explaining the error measurement method.

After the measurement is completed for all of the measuring points (Yes at step S22), J is compared with a predetermined integer JJ in order to determine whether or not the currently measured reflector mirror (J) is the last one of the reflector mirrors (step S24). If the measurement is not completed for all of the reflector mirrors (No at step S24), the flowchart goes back to step S12 whereby 1 is added to J whereby steps S14 to S22 of the measuring process are carried out for the next reflector mirror, for example, the second reflector mirror as shown in FIG. 7 (FIG. 8). The measurement is completed for all of the reflector mirrors (Yes at step S24), the measuring process is completed.

The error calculating and storing means 48 compares the respective coordinates of Pi obtained by solving equation (1) with the machine coordinates obtained by reading the respective digital scales of the X-, Y- and Z-feed axes, whereby the errors of the respective X-, Y- and Z-axes are obtained.

According to the present embodiment, the laser length measuring device 54 is attached to the tool mounting hole at the end of the spindle 22, and therefore the laser length measuring device 54 can be continuously oriented to the first to fourth reflector mirrors 56a-56d by using the three orthogonal linear feed axes, i.e., X-, Y- and Z-axes and the rotational feed axes, i.e., A- and C-axes of the machine tool 10 without providing a special tracking device, and therefore a simple and low cost error measuring apparatus is provided. Further, the laser length measuring device 54 can be automatically attached by using a tool changer incorporated with the machine tool 10.

Although the reflector mirrors are attached to the table through the pallet 28 in the aforementioned embodiment, the reflector mirrors may be directly attached to the table. Further, provision of the pallet 28 with the reflector mirrors 56 precedingly attached thereto enables an automatic error measurement by using a pallet changer (not shown) incorporated with the machine tool 10 and the aforementioned automatic laser length measuring device 54. This enables programmed automatic daily or seasonal error measurements.

Although the laser length measuring device 54 comprising a laser interferometer is used in the aforementioned embodiment, the present invention is not limited to this configuration, and a laser length measuring device which can measure the absolute lengths between the reflector mirrors 56 and the laser length measuring device 56 may be used. In this case, error measurement can be carried out with the reflector mirrors 56 including three reflector mirrors, instead four, if the positions of the mirrors are precedingly known.

If there are errors in the rotational positioning or the inclination of the rotational axis of the rotational feed axes (A- and C-axes), the errors adversely affect the measurement results. Accordingly, the machine tool is assembled while measuring so that the errors are minimized in a reference region. After the machine tool is assembled, the errors of the rotational feed axes (A- and C-axes) within the reference region is stored in order to enable correction during measurement of the liner feed axes (X-, Y- and Z-axes).

In particular, the errors in position and inclination are stored in relation to the rotational angles of the rotational feed axes (A- and C-axes), whereby the feed axes (X-, Y- and Z-axes) are corrected depending on the position errors, and the rotational feed axes are corrected depending on the inclination errors. If the inclination errors of the rotational feed axes (A- and C-axes) are small, declinations of the referent point of the laser length measuring device are stored in relation to the rotational angles of the rotational feed axes (A- and C-axes), whereby only the liner feed axes (X-, Y- and Z-axes) can be corrected so as to position a point of reference of the laser length measuring device at a desired coordinate value.

When measuring the liner feed axes (X-, Y- and Z-axes), by correcting the errors of the rotational axes (A- and C-axes) depending on the rotational positions of the rotational feed axes (A- and C-axes), the errors of the liner feed axes (X-, Y- and Z-axes) can be efficiently measured.

EXPLANATION OF REFERENCE NUMBERS

10 Machine Tool
12 Rear Bed
14 Column
16 Head Stock
18 Bracket
22 Spindle
24 Front Bed
26 Table
28 Pallet
30 Numerical Control Device
32 Processing Program
34 Read and Interpretation Unit
36 Interpolation Unit
46 Servo Unit
50 Feed Motor
52 Measurement Apparatus
54 Laser Length Device
56 Reflector Mirror
56a First Reflector Mirror
56b Second Reflector Mirror
56c Third Reflector Mirror
56d Fourth Reflector Mirror

The invention claimed is:

1. A method of measuring an error in relative positioning between a spindle and a table along linear feed axes of a multi feed axis machine tool having at least two rotational feed axes as well as three orthogonal linear feed axes, i.e., X-, Y- and Z-axes, for changing the relative position between the spindle and the table, the method comprising the steps of:
    attaching at least first to third reflector mirrors to a table of the machine tool;
    attaching a laser length measuring device, adapted to emit a laser beam for measuring a length, to an end of a spindle of the machine tool;
    for a specific one of the reflector mirrors,
        moving the laser length measuring device from one to another of a plurality of predetermined measuring points sequentially relative to the table by driving the three linear feed axes in accordance with position commands defined on the machine coordinate system, the laser length measuring device stopping at each of the predetermined measuring points, and
        orienting the laser length measuring device, at each stop of the measuring points, so as to direct the emitted laser beam to the reflector mirrors by driving the at least two rotational feed axes to obtain optical data relating to a length between the specific one of the reflector mirrors and the laser length measuring device, repeating the moving and the orienting of the laser length measuring device for each of the first to third reflector mirrors;

only after the repeating of the moving and the orienting of the laser length measuring device for each of the first to third reflector mirrors, the coordinates of the respective measuring points are calculated, based on the obtained optical data, along the three orthogonal X-, Y- and Z-axes; and comparing the machine coordinates of the machine tool at the measuring points, specified in the position commands, with the calculated coordinates of the measuring points whereby the errors in the relative positioning between the spindle and the table along the X-, Y- and Z-linear feed axes of the machine tool are obtained.

2. The method according to claim 1, further comprising a step of attaching a fourth reflector mirror to the table of the machine tool, wherein the laser length measuring device is a laser interferometer and the coordinates of the respective measuring points are calculated by measuring the changes in the lengths between the first to fourth reflector mirrors and the laser interferometer.

3. The method according to claim 1, wherein the laser length measuring device measures the absolute lengths between the reflector mirrors and the laser length measuring device.

4. The method according to claim 1, wherein the reflector mirrors comprise retroreflectors.

5. A machine tool with a table to which a workpiece is attached, a spindle, supported for rotation, for holding a tool, linear feed axes for relatively moving the table and the spindle in three orthogonal X-, Y-, and Z-axes directions and at least two rotational feed axes, the machine tool comprising:

a laser length measuring device attached to an end of the spindle and adapted to emit a laser beam for measuring a length; and first to third reflector mirrors attached to a table of the machine tool;

wherein for a specific one of the reflector mirrors, the laser length measuring device is moved, in accordance with position commands defined on the machine coordinate system, from one to another of a plurality of predetermined measuring points sequentially relative to the table by driving the three linear feed axes, the laser length measuring device stopping at each of the predetermined measuring points, and the laser length measuring device is oriented at each stop of the measuring points so as to direct the emitted laser beam to the reflector mirrors by driving the at least two rotational feed axes to obtain optical data relating to a length between the specific one of the reflector mirrors and the laser length measuring device, the moving and the orienting of the laser length measuring device are repeated for each of the first to third reflector mirrors, and only after the repeating of the moving and the orienting of the laser length measuring device for each of the first to third reflector mirrors, the coordinates of the respective measuring points along the three orthogonal X-, Y- and Z-axes are calculated based on the obtained optical data, the calculated coordinates of the measuring points being compared with the machine coordinates of the machine tool at the measuring points whereby errors in relative positioning between the spindle and the table along the X-, Y- and Z-linear feed axes of the machine tool are measured.

6. The machine tool according to claim 5, further comprising a fourth reflector mirror to the table of the machine tool, wherein the laser length measuring device comprises a laser interferometer.

7. The machine tool according to claim 5, wherein the laser length measuring device measures the absolute lengths between the reflector mirrors and the laser length measuring device.

8. The machine tool according to claim 5, wherein the reflector mirrors comprise retroreflectors.

* * * * *